United States Patent

Contreras et al.

[15] 3,663,044

[45] May 16, 1972

[54] UNIVERSAL JOINT

[72] Inventors: Gilbert E. Contreras, Los Angeles; Robert W. Graves, Woodland Hills, both of Calif.

[73] Assignee: Aeroquip Corporation, Jackson, Mich.

[22] Filed: May 4, 1970

[21] Appl. No.: 34,160

[52] U.S. Cl. ............................................ 285/226, 285/265
[51] Int. Cl. ................................................ F16l 21/00
[58] Field of Search ............... 285/226, 265; 64/18; 248/182

[56] References Cited

UNITED STATES PATENTS

| | | | |
|---|---|---|---|
| 1,220,270 | 3/1917 | Phillips | 285/265 X |
| 835,076 | 11/1906 | Martin | 285/265 |
| 2,936,185 | 5/1960 | Olsen et al. | 285/265 X |
| 1,450,707 | 4/1923 | Anderson | 64/18 |
| 3,461,688 | 8/1969 | Garfinkle | 64/18 |

Primary Examiner—Dave W. Arola
Attorney—Jerry K. Harness

[57] ABSTRACT

A universal joint used in conjunction with flexible bellows duct connections to restrain axial loading. Two sleeves connected by the bellows have pairs of diametrically opposed lugs pivoted to a gimbal ring. This ring is of non-circular shape, and in particular has four uncurved sides connected to the lugs, these sides being joined in one version of the invention by square corners and another by rounded corners.

8 Claims, 7 Drawing Figures

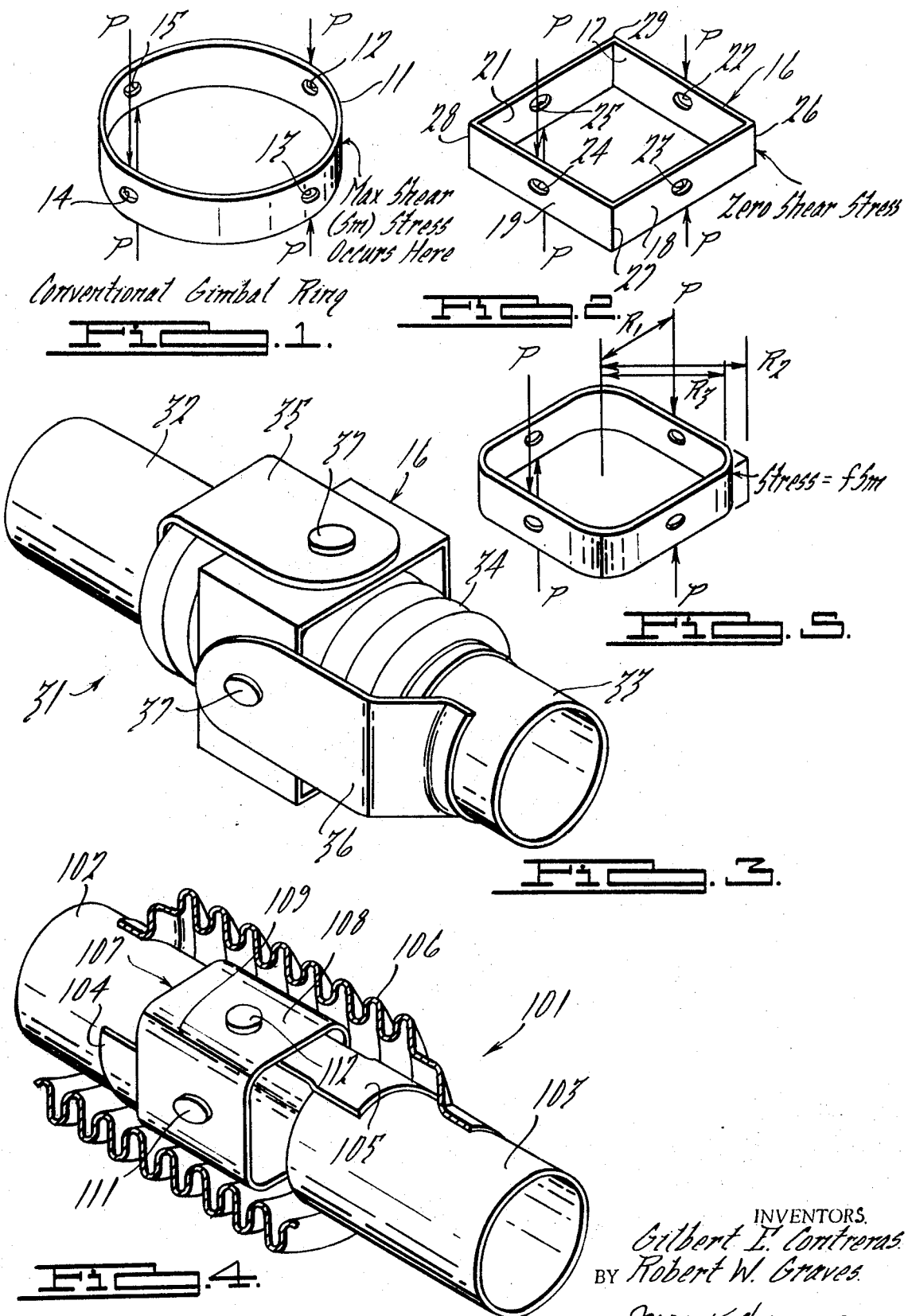

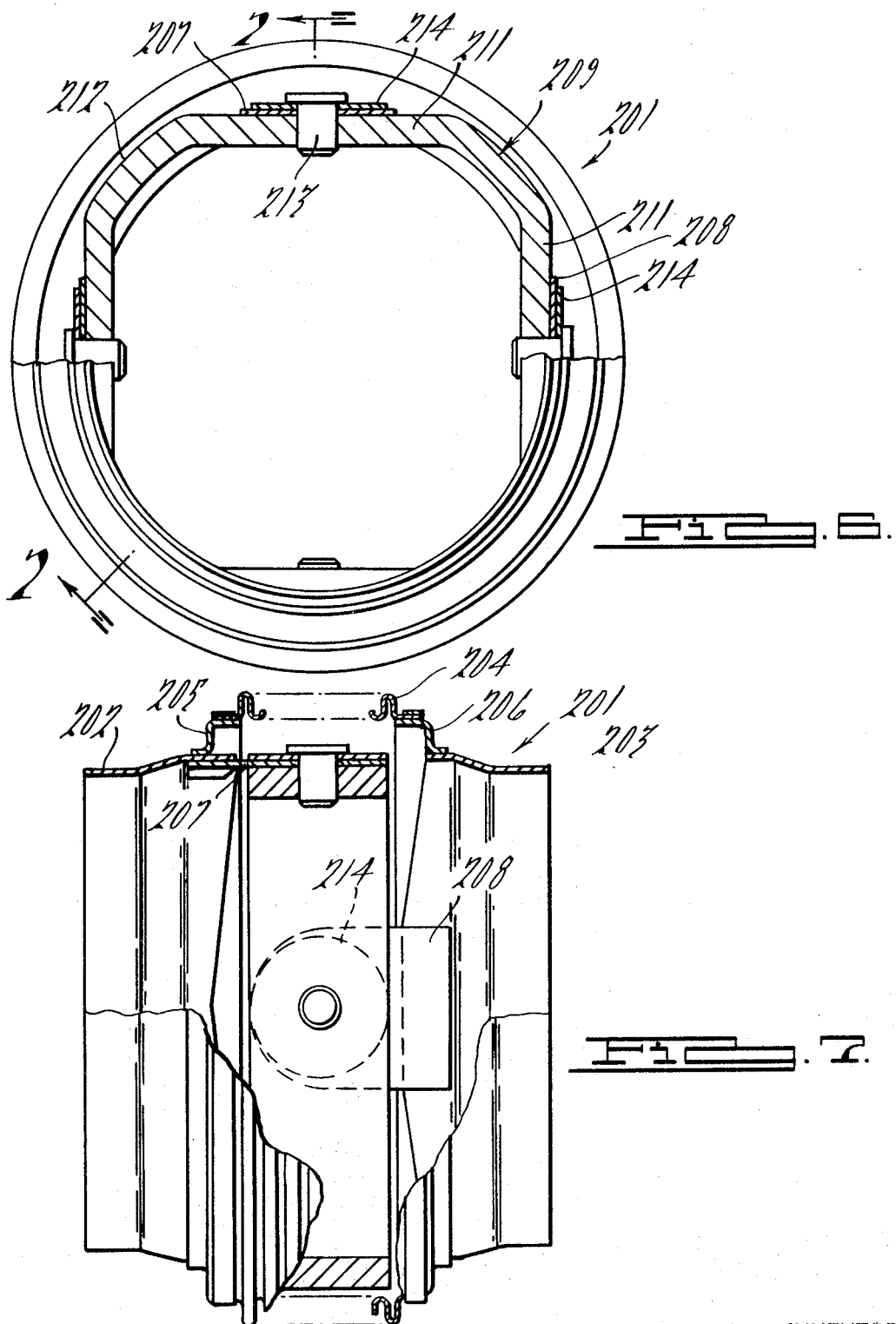

UNIVERSAL JOINT

BACKGROUND OF THE INVENTION

1. Field of the Invention

The invention relates to universal joints to be subjected to axial loading, and more particularly to ducting or pipe systems connected by flexible bellows joints or the like, in which it is desired to restrain the connected ducts against endwise or axial movement.

2. Description of the Prior Art

Universal joints have been conventionally used for this purpose, these joints comprising pairs of oppositely disposed lugs attached to the duct ends and extending toward each other, the lugs being pivoted to gimbal rings and being either inside or outside the bellows. The shape of the gimbal rings in these prior constructions has been round. When such rings are subjected to four point transverse loading by endwise pressure from the lugs, the maximum torsion shear stresses occur midway between the loading points which are at the lug pivots. Although other stresses are also present, the torsion shear stresses are normally the governing criterion. As a result, such round gimbal rings comprise the heaviest member in the joint and are generally the most expensive.

SUMMARY OF THE INVENTION

According to the invention, the round gimbal ring is replaced by a ring which is either square or at least has uncurved sides connected by rounded corners. This construction minimizes or eliminates the above-mentioned torsion shear stresses created by the four point transverse loading and thus achieves a stronger joint for the same amount of material or, more importantly, permits the use of a smaller section or less expensive material and permits the joint to be made smaller with respect to the duct diameter, additionally reducing the total weight of the assembly. The construction may use plate or sheet metal as compared with machine forgings or rods required in previous constructions, thus further reducing cost.

BRIEF DESCRIPTION OF THE DRAWINGS

FIG. 1 is a perspective view of the conventional gimbal ring, with force arrows showing how the maximum torsional shear stress is developed;

FIG. 2 is a perspective view of one embodiment of the gimbal ring of this invention, having square corners, and illustrating the elimination of shear stress midway between the pressure points;

FIG. 3 is a perspective view of a joint utilizing the gimbal ring of FIG. 2;

FIG. 4 is a perspective view with parts cut away showing another embodiment of the invention in which the gimbal ring has rounded corners and is inside the bellows;

FIG. 5 is a perspective view of the gimbal ring of FIG. 4 showing the dimensions which affect the shear stress;

FIG. 6 is an end elevational view, partly sectioned, of a third embodiment of the invention which is similar to that of FIGS. 4 and 5; and FIG. 7 is a cross-sectional view of the joint of FIG. 6 taken along the line 7—7 thereof.

DESCRIPTION OF THE PREFERRED EMBODIMENTS

In order to understand the invention, reference is first made to FIG. 1 which shows a conventional gimbal ring 11 having four holes 12, 13, 14 and 15 spaced 90° apart. In conventional constructions, one sleeve or duct has a pair of diametrically opposed lugs (not shown) pivotally connected to holes 12 and 14 and the other duct has lugs connected to holes 13 and 15. The bellows (also not shown with respect to FIG. 1) connects the ducts either inside or outside the lugs and ring.

Axial or endwise forces exerted between the ducts will be transmitted to gimbal ring 11 as shown by the four arrows P, the forces being opposed to each other at 90° intervals. The maximum torsional shear stress (marked $S_m$ in FIG. 1) occurs midway between each pair of adjacent holes when the gimbal ring is subjected to this four point transverse loading. Normally, despite the presence of other stresses, this torsion shear stress $S_m$ is the governing criterion in selecting the dimensions and material for gimbal ring 11. As a result, this gimbal ring generally comprises the heaviest member of the flexible joint.

One embodiment of the new construction is shown in FIG. 2. The gimbal is generally indicated at 16 and comprises four portions 17, 18, 19 and 21, with holes 22, 23, 24 and 25 respectively. Portions 17 to 21 are uncurved in a circumferential direction, and are shown as being flat. The adjacent portions of the gimbal are connected by substantially square corners 26, 27, 28 and 29. The gimbal may be fabricated of bent bar construction using plate or sheet.

The joint with which gimbal ring 16 is used is shown in FIG. 3 and is indicated generally at 31. The joint comprises a pair of sleeves or ducts 32 and 33 connected by a flexible bellows 34 which is secured to the outer surfaces of the sleeves. In the embodiment of FIG. 3, gimbal ring 16 is outside bellows 34. Two of the holes are connected to lugs 35 mounted on sleeve 32, and the other two diametrically opposite holes are connected to lugs 36 mounted on sleeve 33. The connection is by means of rivets 37 which allow pivotal movement.

In operation of the embodiment of FIGS. 2 and 3, ducts 32 and 33 may be moved to their any desired angular relation by the action of the universal joint and bellows 34. In any position, endwise or axial forces between the ducts will be transmitted through gimbal ring 16. The torsional shear stress, which as pointed out above is normally at a maximum midway between the pivotal connections, will be zero at square corners 26 through 29.

Referring to the embodiment shown in FIGS. 4 and 5, this construction has the same basic principles as the first construction but the gimbal ring and lugs are within the bellows rather than outside of it. For this reason, it is impractical to have absolutely square corners. Therefore, the gimbal ring has straight sides but the corners are rounded.

The joint is indicated generally at 101 in FIG. 4 and comprises a pair of ducts 102 and 103 having pairs of lugs 104 and 105 respectively. A flexible bellows 106 is secured at its opposite ends to the ducts and extends between them.

The gimbal ring is generally indicated at 107 and, like gimbal ring 16 of the previous embodiment, may be fabricated of bent bar construction using plate or sheet. Ring 107 has four straight sides 108 connected by rounded corners 109. Pivots 111 connect the ring with lugs 104 and pivots 112 connect it with lugs 105.

The stress at corners 109 due to axial forces exerted between the ducts will be proportional to the radius of curvature of the corners in the following manner:

Stress $= f \times S_m$

Where $f =$ proportional factor between square and round gimbal dependent on ratio of:

$$(R_2 - R_3)/(R_2 - R_1)$$

$R_1$, $R_2$, and $R_3$ are indicated in FIG. 5.

FIGS. 6 and 7 illustrate a third embodiment of the invention which is similar to that of FIGS. 4 and 5 but which shows somewhat different constructional details. The joint is generally indicated at 201 and comprises a pair of ducts 202 and 203 connected by a flexible bellows 204. The bellows is secured to annular brackets 205 and 206 carried by ducts 202 and 203 respectively. A pair of diametrically opposed lugs 207 are secured to the inside of ducts 202 and a similarly mounted pair of lugs 208 extend from duct 203.

The gimbal is indicated generally at 209 and comprises four straight sides 211 connected by four rounded corners 212. Two of the sides are connected to lugs 207 and the other two to lugs 208. The connecting means comprises pivots 213 extending through the brackets and gimbal sides with washers 214 being provided.

In operation, the shear stresses at the corners of gimbal 209 will be similar to that of the previous embodiment, their magnitude being determined by the above stated formula.

What is claimed is:

1. In a universal joint for connecting two parts, a pair of diametrically opposed lugs extending from one of said parts toward the other part, a second pair of diametrically opposed lugs extending from said other part toward the first part, adjacent lugs being 90° apart when the parts are aligned, a gimbal ring between said parts, and pivotal connections between said gimbal ring and said lugs, the four portions of said gimbal ring in the vicinity of said pivotal connections being substantially uncurved forming a substantially square configuration, whereby the torsional shear stress created at the corners of said gimbal ring by axial forces between said parts will be reduced.

2. The combination according to claim 1, said uncurved portions being flat.

3. The combination according to claim 1, the corners of said gimbal ring being square.

4. The combination according to claim 1, the corners of said gimbal ring being slightly rounded.

5. The combination according to claim 4, the uncurved portions of said gimbal ring being flat.

6. In a universal joint for connecting two ducts, a flexible bellows extending between and secured to the ducts, a pair of diametrically opposed lugs extending from each duct toward each other, adjacent lugs being spaced 90° apart, a gimbal ring, and pivotal connections between said lugs and said gimbal ring, the portions of said gimbal ring in the vicinity of said pivotal connections being uncurved forming a substantially square configuration, whereby the torsional shear stress at the corners of said gimbal ring created by axial forces between said ducts will be reduced.

7. The combination according to claim 6, said uncurved portions of the gimbal ring being flat, the gimbal ring and lugs being outside said flexible bellows.

8. The combination according to claim 6, said uncurved portions of the gimbal ring being substantially flat, said corners of the gimbal ring being slightly rounded, the gimbal ring and lugs being inside said flexible bellows.

* * * * *